(12) United States Patent
Lang et al.

(10) Patent No.: US 11,208,790 B1
(45) Date of Patent: Dec. 28, 2021

(54) PORTABLE WATER SUPPLY APPARATUSES AND METHODS OF USE

(71) Applicants: Tim Lang, Enid, OK (US); Michael Lang, Enid, OK (US)

(72) Inventors: Tim Lang, Enid, OK (US); Michael Lang, Enid, OK (US)

(*) Notice: Subject to any disclaimer, the term of this patent is extended or adjusted under 35 U.S.C. 154(b) by 412 days.

(21) Appl. No.: 15/821,721

(22) Filed: Nov. 22, 2017

Related U.S. Application Data (60) Provisional application No. 62/426,376, filed on Nov. 25, 2016.

(51) Int. Cl.
| | |
|---|---|
| *E03B 11/02* | (2006.01) |
| *G05D 16/20* | (2006.01) |
| *B60P 3/22* | (2006.01) |
| *B05B 13/00* | (2006.01) |

(52) U.S. Cl.
CPC .............. *E03B 11/02* (2013.01); *B60P 3/225* (2013.01); *B60P 3/2205* (2013.01); *G05D 16/2066* (2013.01); *B05B 13/005* (2013.01)

(58) Field of Classification Search
CPC ........ E03B 11/02; B60P 3/225; B60P 3/2205; G05D 16/2066; B05B 13/005
See application file for complete search history.

(56) References Cited

U.S. PATENT DOCUMENTS

| | | | | |
|---|---|---|---|---|
| 3,984,059 A | * | 10/1976 | Davies | B63B 27/24 |
| | | | | 141/387 |
| 4,456,039 A | * | 6/1984 | van der Lely | A01C 23/045 |
| | | | | 141/231 |
| 4,981,318 A | * | 1/1991 | Doane | B60P 3/14 |
| | | | | 296/182.1 |
| 5,240,043 A | * | 8/1993 | Campbell | B67D 7/002 |
| | | | | 137/211 |
| 5,950,662 A | * | 9/1999 | Scott | F16L 5/00 |
| | | | | 137/209 |
| 6,248,242 B1 | * | 6/2001 | Martin | C02F 1/78 |
| | | | | 141/1 |
| 6,629,542 B2 | * | 10/2003 | Cams | C02F 1/004 |
| | | | | 137/1 |
| 8,061,752 B2 | * | 11/2011 | Ohnstad | B05B 16/80 |
| | | | | 296/26.15 |
| 9,890,056 B2 | * | 2/2018 | Havi | C02F 1/283 |
| 10,207,937 B2 | * | 2/2019 | Havi | H02J 7/1415 |
| 2006/0064929 A1 | * | 3/2006 | Allen | A01G 29/00 |
| | | | | 47/48.5 |
| 2006/0163903 A1 | * | 7/2006 | Schlipp | B60J 7/026 |
| | | | | 296/100.03 |
| 2011/0089123 A1 | * | 4/2011 | Kennedy | C02F 1/001 |
| | | | | 210/808 |
| 2012/0042833 A1 | * | 2/2012 | Gunn | A01K 7/06 |
| | | | | 119/408 |
| 2013/0098816 A1 | * | 4/2013 | Elfstrom | C02F 1/00 |
| | | | | 210/153 |

(Continued)

*Primary Examiner* — Nicolas A Arnett (74) *Attorney, Agent, or Firm* — John M. Behles (57) ABSTRACT

Portable water delivery apparatuses and methods of use are disclosed herein. An example apparatus includes a portable frame trailer having: a base; and at least two wheels, a tank configured to be transported on the portable frame trailer, a pump for delivering water in the tank to an interface, means for coupling the pump to a water input in a structure, and a portable power supply delivering power to the pump.

11 Claims, 11 Drawing Sheets

(56) References Cited

U.S. PATENT DOCUMENTS

| | | | |
|---|---|---|---|
| 2014/0077484 A1* | 3/2014 | Harrell | B60P 3/2205 280/837 |
| 2015/0059330 A1* | 3/2015 | Thirunavukarasu | E01C 19/17 60/430 |
| 2015/0226597 A1* | 8/2015 | Gaspard, Jr. | G01F 25/0007 73/1.16 |
| 2018/0080914 A1* | 3/2018 | Baucom | G01N 1/08 |
| 2018/0272164 A1* | 9/2018 | Knight | A62C 27/00 |

* cited by examiner

PORTABLE WATER SUPPLY APPARATUSES AND METHODS OF USE

CROSS REFERENCE TO RELATED APPLICATIONS

This non-provisional application claims the benefit and priority of U.S. Provisional Application 62/426,376, filed on Nov. 25, 2016, which is hereby incorporated by reference herein in its entirety including all references and appendices cited therein, for all purposes.

FIELD OF TECHNOLOGY

The present disclosure is generally directed to water supply apparatuses, and more specifically, but not by limitation, to portable water supply apparatuses that deliver water to a home or other structure. These portable water supply apparatuses include an interface for coupling with a main water line of the home and can deliver pressurized water to the home when water utility services have been disrupted.

SUMMARY

Some embodiments of the present disclosure are directed to a portable water delivery apparatus comprising: a portable frame trailer including: a base; and at least two wheels; a tank configured to be transported on the portable frame trailer; a pump for delivering water in the tank to an interface; means for coupling the pump to a water input in a structure; and a portable power supply delivering power to the pump.

Implementations may include one or more of the following features. The portable water delivery apparatus further including a metering system coupled with the pump, the metering configured to sense a drop in water pressure, where upon sensing a drop in water pressure, the pump delivers the water to the water input. The portable water delivery apparatus further including arcuate tie down rails that interface with the base of the portable frame trailer and overlap the tank to secure the tank to the base. The portable water delivery apparatus further including a housing that covers the portable power supply. The portable water delivery apparatus where the housing is hingedly coupled to the base of the portable frame trailer. The portable water delivery apparatus where the housing includes a hinged access panel that allows for access to the portable power supply when the housing is in a closed position. The portable water delivery apparatus further including a base enclosure that encloses at least the tank and the pump. The portable water delivery apparatus where the base enclosure further includes access bilateral access doors disposed forwardly of the two or more wheels. The portable water delivery apparatus where the base enclosure is lined with an insulating spray foam material. The portable water delivery apparatus further including a hitch for coupling with a vehicle. The portable water delivery apparatus where the means for coupling the pump to a water input in a structure includes a one way valve that is installed on a main water line of a structure at a water meter for the structure. The portable water delivery apparatus where the one way valve is installed upstream of the water meter to prevent water pumped by the pump from flowing through the meter.

Some embodiments of the present disclosure are directed to a method for supplying water to a structure, the method including: connecting a portable water delivery apparatus to a main water line of a structure, where the portable water delivery apparatus includes: a portable frame trailer including: a base; and at least two wheels; a tank configured to be transported on the portable frame trailer; a pump for delivering water in the tank to an interface; means for coupling the pump to a water input in a structure; and a portable power supply delivering power to the pump; sensing opening of a water tap within the structure; activating the pump to deliver water into the main water line; sensing closing of the water tap within the structure; and shutting off the pump when the water tap is closed.

Implementations may include one or more of the following features. The method can include where connecting a portable water delivery apparatus to a mainline of a structure includes coupling the pump to an external faucet of the structure through a conduit. The method can include connecting a portable water delivery apparatus to a cold water input of a hot water heater of the structure through a conduit. The method can include where the pump is controlled to deliver water to the structure at a rate that is substantially equal to a local water pressure. The method can include where a pressure of the water delivered by the pump can be selectively controlled. The method can include where a metering system is configured to control the pump to compensate for water pressure dropping due to additional water taps opening within the structure. The method can include installing a one way valve on the main water line of a structure proximate a water meter of the structure.

Some embodiments of the present disclosure are directed to a portable water delivery apparatus comprising: a portable frame trailer including: a base; and at least two wheels; a tank configured to be transported on the portable frame trailer; a pump for delivering water in the tank to an interface; means for coupling the pump to a water input in a structure; a metering system controlling the pump, where the metering system is configured to: sense variations in water pressure in the structure; and control operations of the pump to compensate for the variations in water pressure; and a portable power supply delivering power to the pump.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

The present disclosure is directed to various types of portable water supply apparatuses that are used to deliver water at a specific or selectable pressure to a home when a local water supply is unavailable (or is insufficient) either temporarily or permanently.

In some embodiments, an example apparatus is connected to a water input for a structure such as a tie-in or interface at a main water line supplying water to the structure. In another example, the apparatus can interface with a water heater within the structure. For example, an output line of the apparatus can couple with an input of the water heater that normally receives water from the main line of the structure. In general, while the embodiments disclosed herein contemplate the delivery of water, the apparatuses of the present disclosure can be configured to deliver any liquid or fluid desired. For example, liquid could be pumped into the main water line of a home to clean the water lines in the home. In another example, pressurized water can be pumped into the main water line to clear an obstruction in a water line in the home.

In one embodiment, an example apparatus comprises a custom made structure with a steel floor, steel sides and steel roof. While these materials have been disclosed, one of skill in the art will appreciate that many other materials can be utilized that would be known to one of skill in the art. The water tank comprises an access point proximate the top of the trailer to fill the water tank. In some embodiments, the top of the housing comprises a bolt down top that can be removed to work on or replace the water tank.

A constant pressure pump is used to deliver water to a structure from the water tank at a continuous water pressure level. The pump can be plugged into a 110V source anywhere there is power or by using a generator. The trailer/apparatus is provided with any number of wheels or other implements that allow the apparatus to be moved from one location to another with ease.

In general, the apparatuses of the present disclosure are sized so that they can be received and retained within a standard garage. These and other advantages of the present disclosure are described in greater detail herein with reference to reference to the collective drawings.

FIGS. 1-4 collectively illustrate an example portable water supply apparatus 100. In general, the apparatus 100 comprises a water tank 102, power supply 104 (see FIG. 7), water pump 106, and metering system 108 (could be included as a part of the pump itself) that cooperate together to deliver water to a structure (see FIGS. 14 and 15). The metering system 108 is connected to a water output line 110 (also see FIGS. 14 and 15) coming from the water pump 106. The metering system 108 senses a drop in water pressure in the structure, such as from a tap or faucet being opened in the structure. When a drop in water pressure is sensed, the metering system 108 triggers activation of the water pump 106 to output water at a given pressure from the water tank 102. In some embodiments, the water pressure generated by the water pump 106 is substantially equal to a local water pressure. In other embodiments, the water pressure is selectable and could be above or below the local water pressure. In some embodiments, the apparatus 100 can be used to supplement low water pressure in certain locations. The metering system 108 may also be used to selectively increase the water pressure to the structure. Thus, in some embodiments, water for the structure might be available, but it lacks sufficient pressure. The apparatus 100 can augment the existing water supply and increase the water pressure.

The metering system 108 can comprise a controller or microprocessor as well as a wireless transmitter. In some embodiments, the water pump 106 can be wirelessly controlled by an application executing on a mobile device.

Thus, the water pump 106 has selectively controllable pressure settings rather than constant pressure. The water pump 106 can be controlled remotely through the use of a wireless interface installed on the on the portable water supply apparatus. In some embodiments, a water pressure output by the water pump 106 can be controlled through an application that executes on a mobile device. Thus, when a portable water supply apparatus is installed at a structure, such as a user's home, the user can increase and/or decrease the water pressure delivered to the home by the portable water supply apparatus by the application. That is, the user's mobile device communicates with a controller coupled to the water pump 106, or the water pump 106 directly, to selectively adjust an output of the water pump 106.

The application can also provide alerts to the user, such as when water levels are low inside the water tank of the portable water supply apparatus. In some embodiments an electronic float or other similar means such as a water level transmitter or level gauge within the water tank can transmit water level signals to the application on the mobile device. When the water level falls below a threshold established within the application, an alert message is triggered. In some embodiments, the application can automatically transmit a shutdown signal to the pump when the alert is received. This prevents the water pump 106 from operating when a water level in the water tank is insufficient.

The apparatus 100 is self-contained and the water tank 102 can be refiled when water volume within the water tank is low. In some embodiments, the water tank comprises a built in float that prevents water from overfilling in the water tank. In general, the water tank 102 comprises a fill port 118 disposed on an upper part of the water tank 102. In other embodiments, the water tank 102 comprises a hose interface 120 that couples with a hose 122. Water can be introduced into the water tank 102 through the hose 122. In some embodiments, the water tank is a polymer tank (e.g., food grade) and can be refilled using either of the fill port or interface.

In some embodiments, the apparatus 100 comprises a metallic frame 124, referred to as portable frame trailer. The frame 124 comprises a base 126 and at least two wheels.

In some embodiments, the apparatus 100 comprises arcuate tie down rails, such as rail 128 that interface with the base 126 of the portable frame trailer and overlap the tank 102 to secure the tank to the base 126.

According to some embodiments, the frame 124 comprises a hitch 129 that allows the apparatus 100 to be coupled to a vehicle for transport.

In some embodiments, the apparatus comprises a 750 gallon portable water tank mounted onto the frame 124, as well as a 1 HP 115V constant pressure pump. In one embodiment, the frame 124 comprises an access point or pass-through where a water line can be brought from under the apparatus 100 to the water pump 106. A water output line can then be run to the input point in the structure. In some embodiments, a thermostatic hose is utilized for cold temperature operations.

In general, an input point of a the structure can include an external faucet, a cold water line of a hot water heater, or an interface install on a main water line that supplies water to the home from a metered connection. Each of these installation types will be discussed in greater detail infra.

Figure 1:
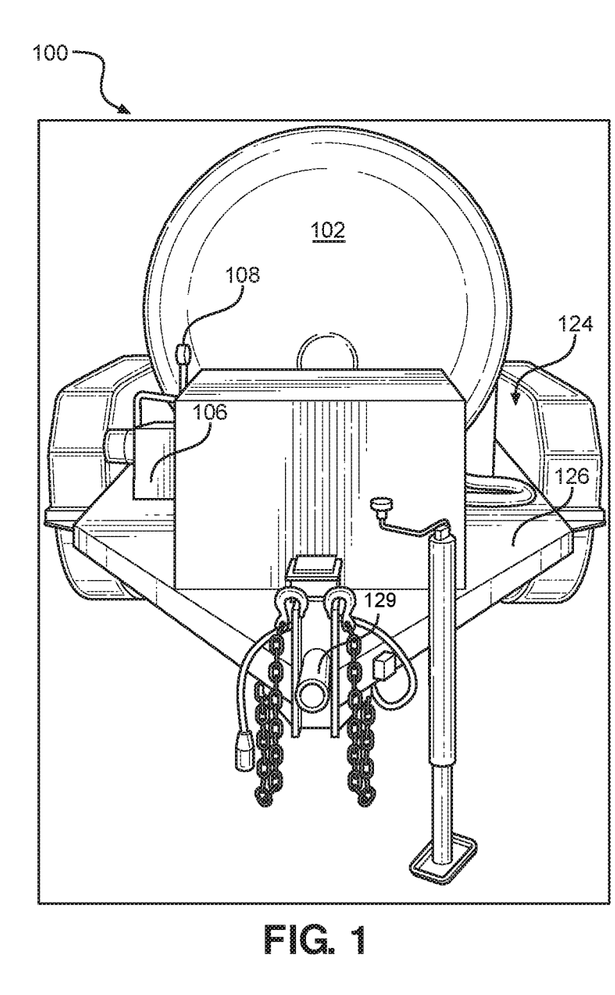
FIG. 1 is a front perspective view of an example portable water supply apparatus of the present disclosure.
Figure 2:
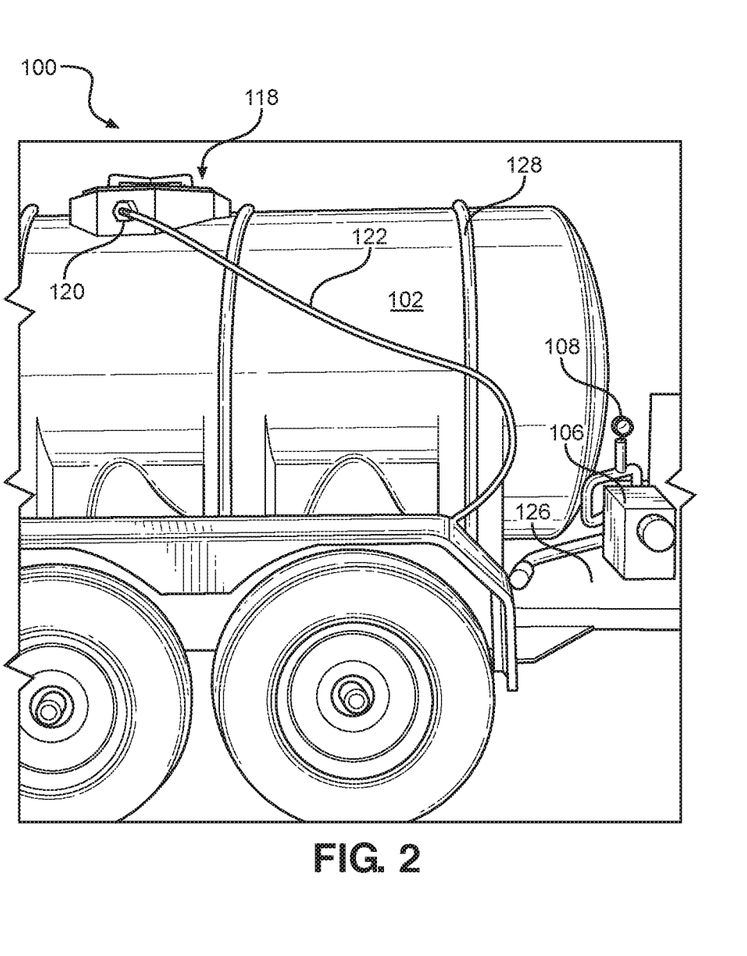
FIG. 2 is a side perspective view of an example portable water supply apparatus.
Figure 3:
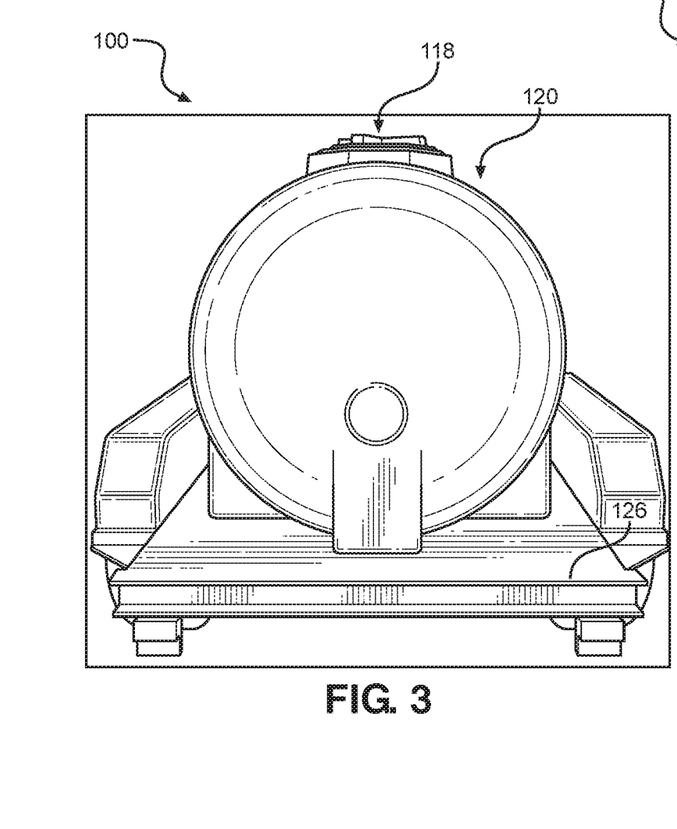
FIG. 3 is a rear perspective view of an example portable water supply apparatus.
Figure 4:
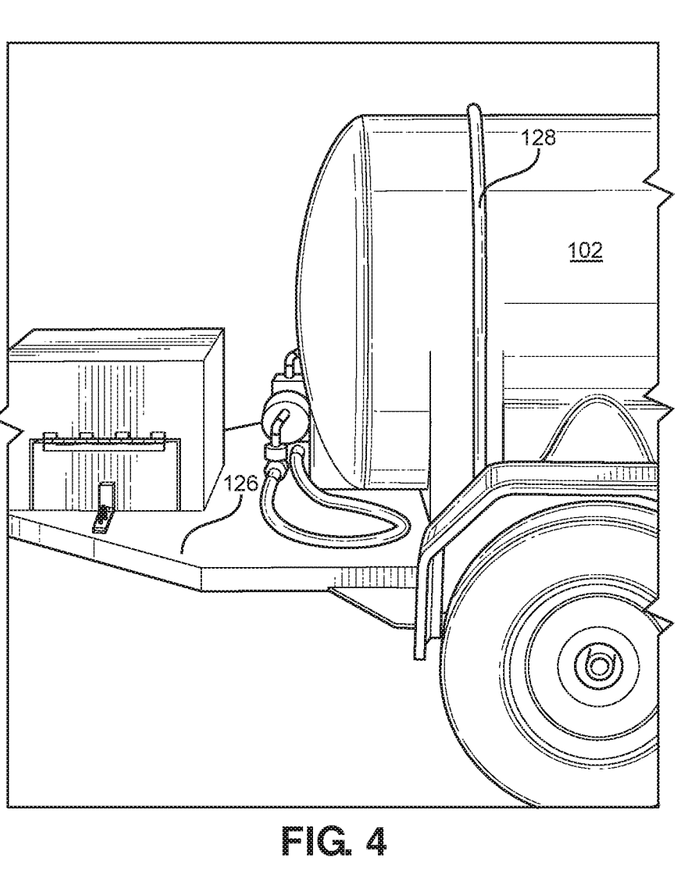
FIG. 4 is an alternate side perspective view of an example portable water supply apparatus.
Figure 5:
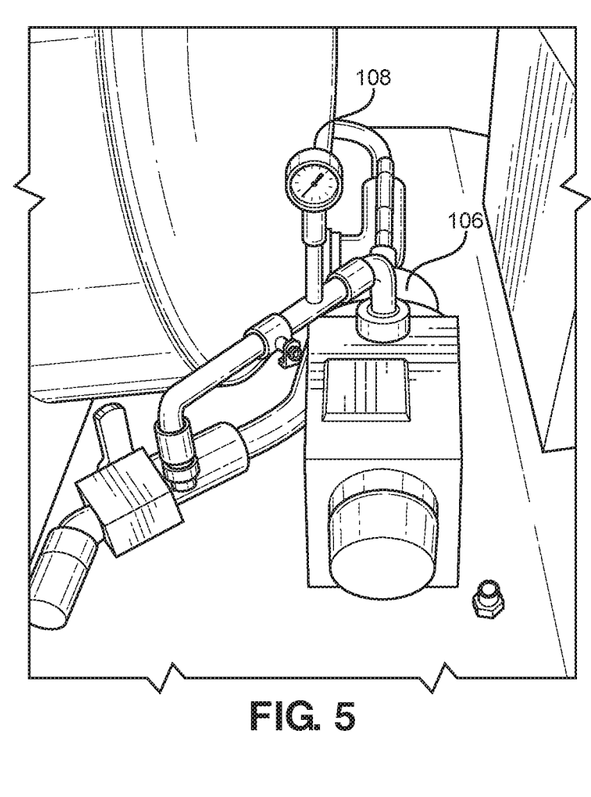
FIG. 5 is a close-up perspective view of a pump and metering system of an example portable water supply apparatus.
Figure 6:
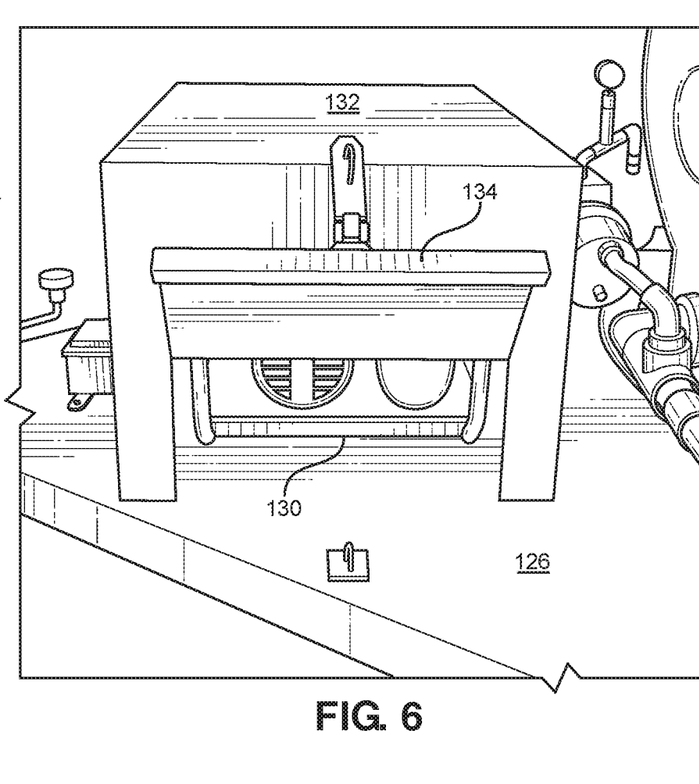
FIGS. 6-8 collectively illustrate a portable power supply and hinged housing of an example portable water supply apparatus.
Figure 7:
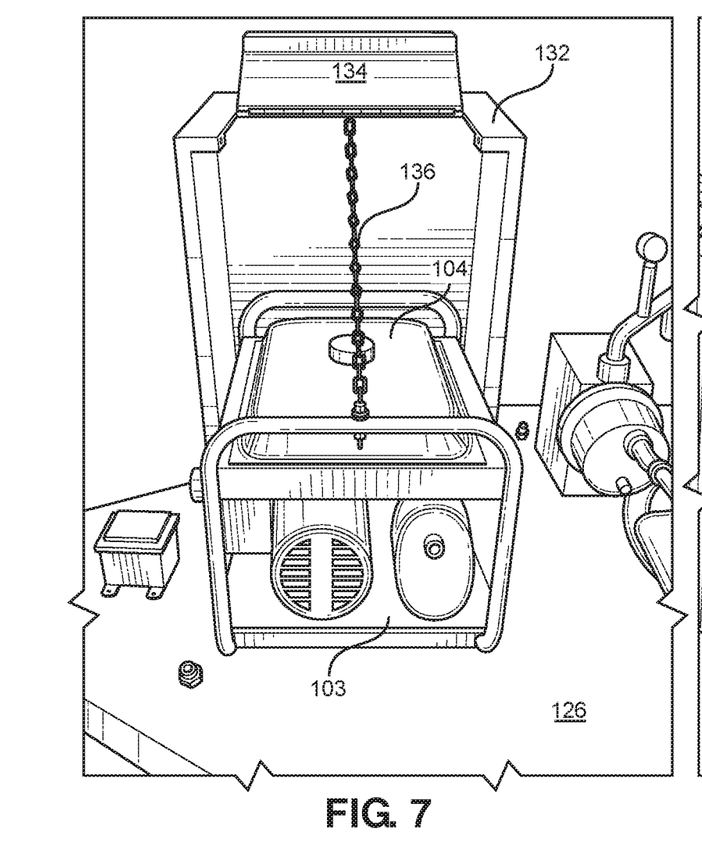
Figure 8:
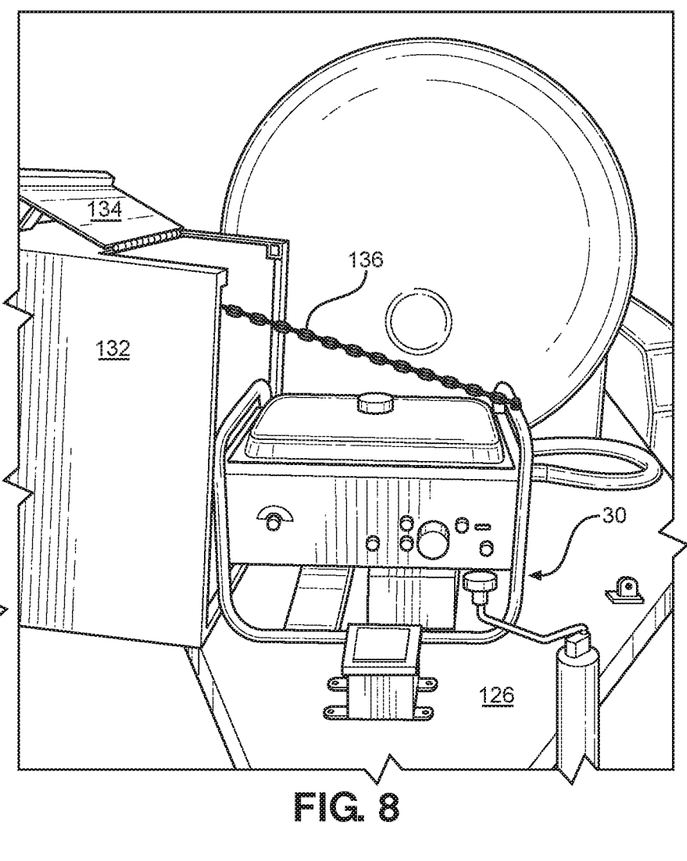
Figure 9:
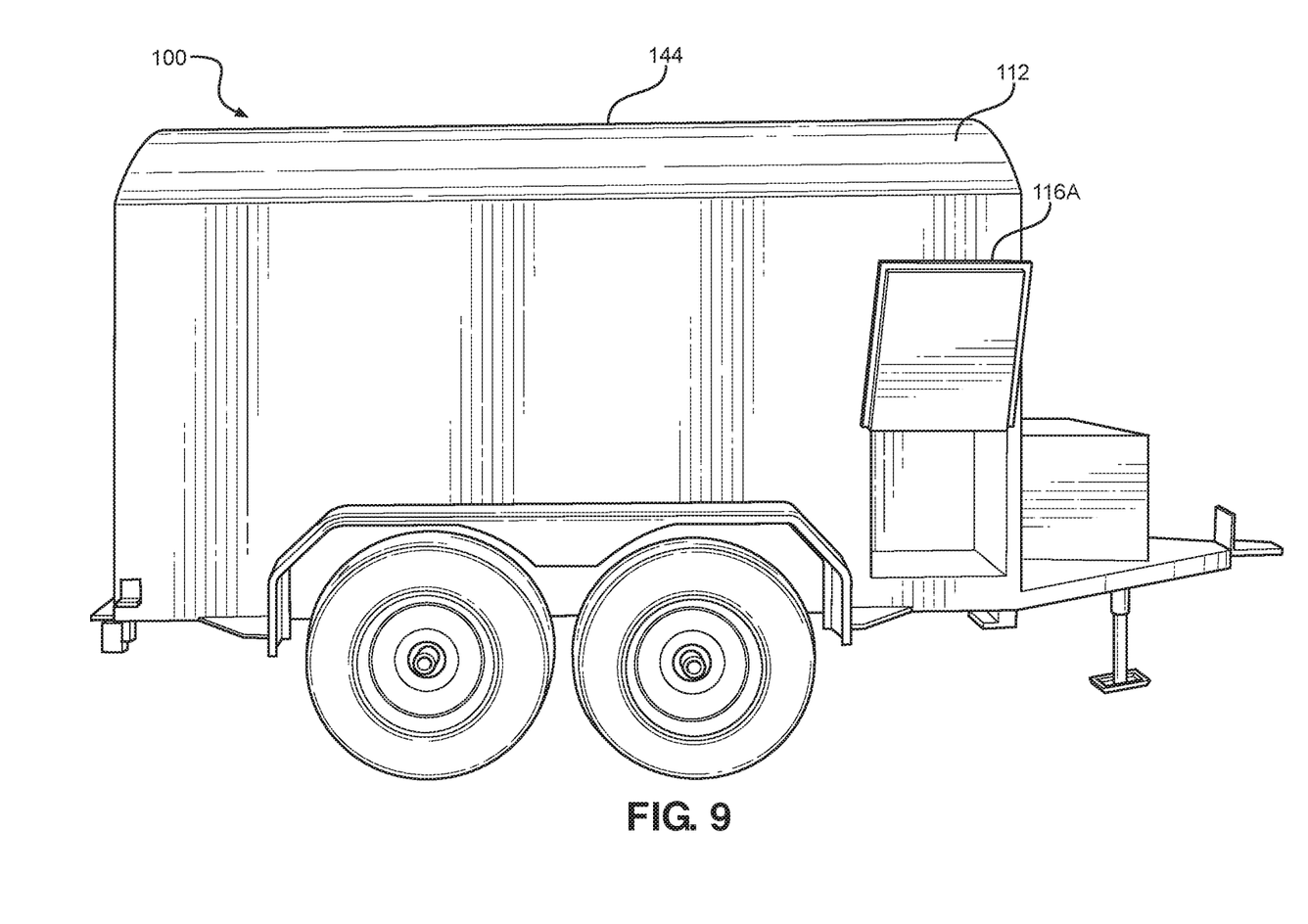
FIGS. 9-12 collective illustrate an enclosure or enclosed version of an example portable water supply apparatus.
Figure 10:
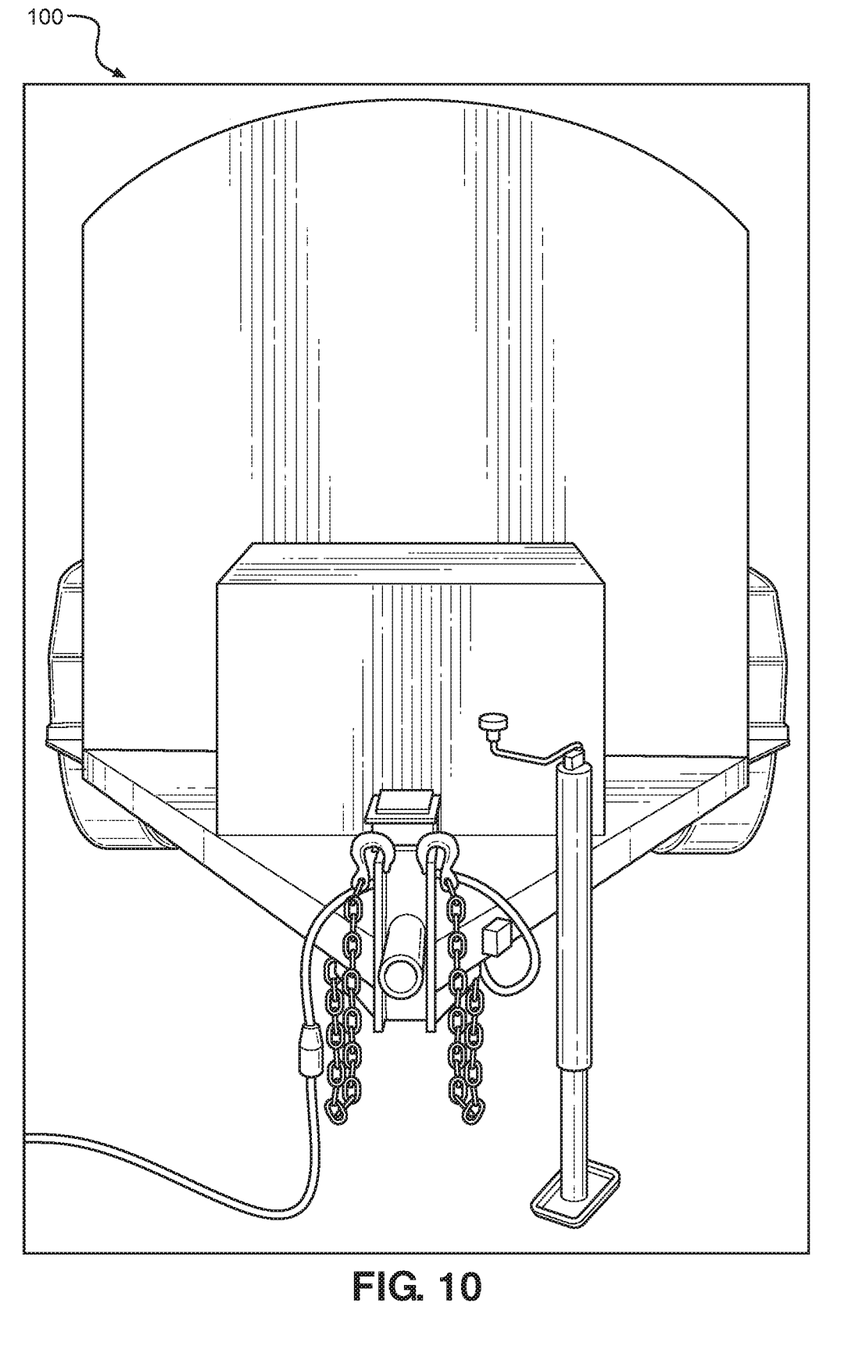
Figure 11:
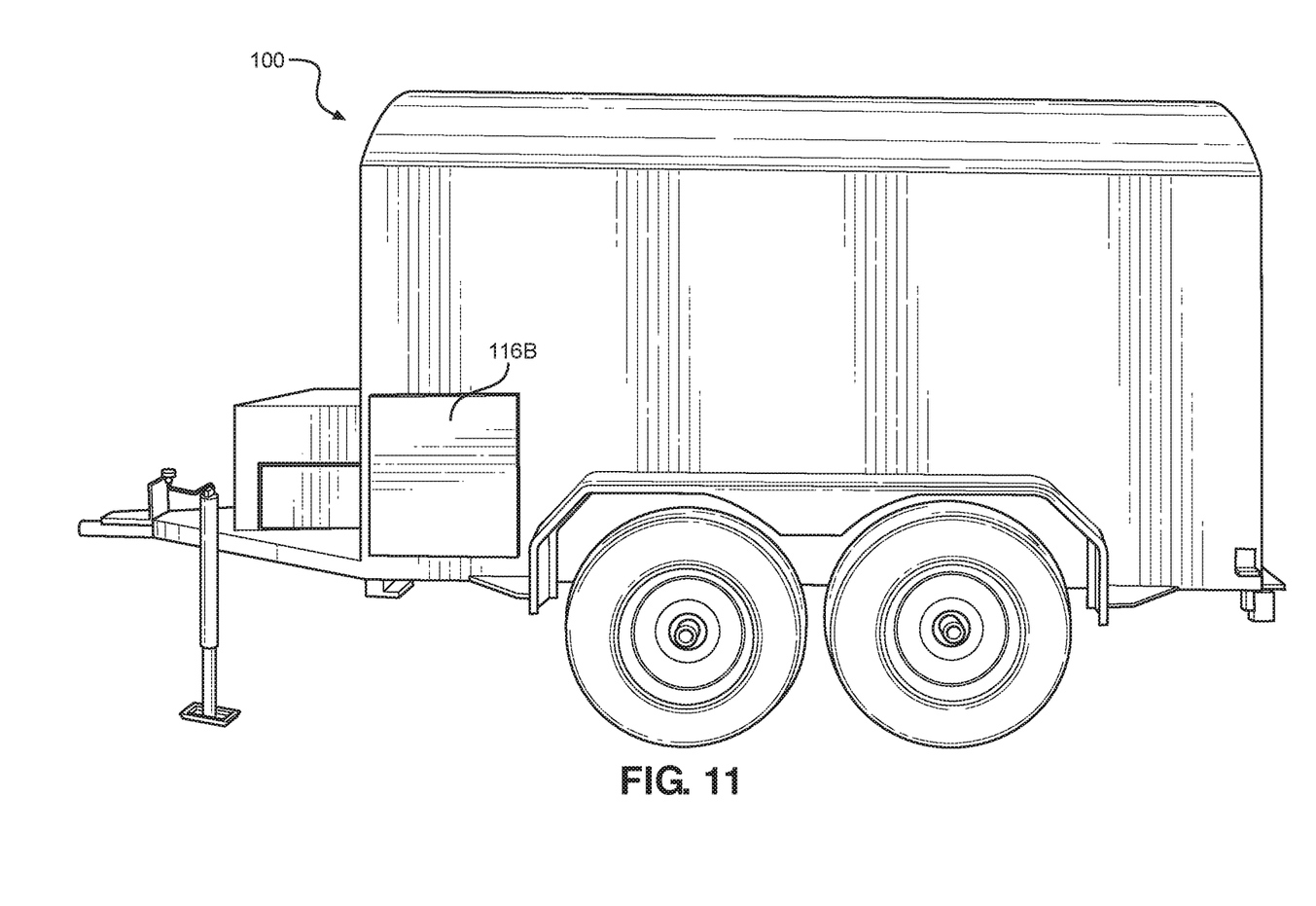

Referring collectively to FIGS. 6-8, the water pump 106 can be coupled to the power supply of the structure, while in other embodiments the apparatus comprises a generator or power supply 130 that powers the components of the apparatus such as the metering system and/or the pump.

In some embodiments, the frame 124 comprises a lock-box cover that encloses the generator. That is, the apparatus 100 comprises housing 132 (e.g., lock-box cover) that covers the power supply 130. In various embodiments, the housing 132 comprises a rectangular or cubic enclosure that is hingedly coupled to the base 126 of the frame 124. The housing 132 comprises a hinged access panel 134 that allows for access to the portable power supply 130 when the housing 132 is in a closed position, as illustrated best in FIG. 6. The hinged access panel 134 can be locked in place against a cleat anchored to the base 126. In some embodiments the power supply 130 comprises a portable generator, but could also include an integrated generator. Rather than using a generator, the water pump can alternatively receive power at a structure. For example, the water pump can be powered using an electrical outlet at a home.

Hinged movement of the housing 132 is illustrated in FIGS. 7 and 8. In some embodiments, a travel limiter 136, such as a chain is connected to the housing 132 and the power supply 130. The travel limiter 136 limits how far the housing 132 hinges.

FIGS. 9-13 collectively illustrate a housing 112 (also referred to as a base enclosure) in combination with a removable top 114 that provides access to the components of the apparatus 100, such as the fill port 118 (see FIG. 2) of the tank 102. In one embodiment, the housing 112 comprises bilateral access doors 116A (FIG. 9) and 116B (FIG. 11) that provide access to the inside of the apparatus 100, such as for connecting a water output line 110 to the water pump 106. In one or more embodiments the bilateral access doors are disposed forwardly of the at least two wheels.

Figure 12:
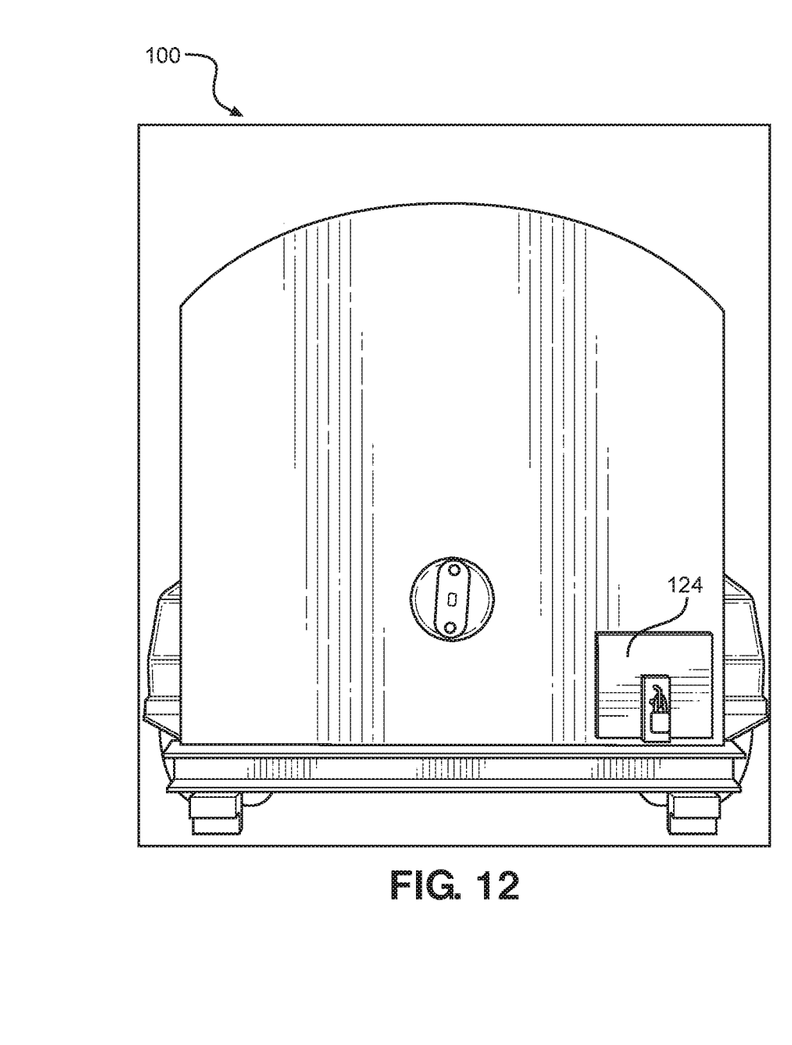

As illustrated in FIG. 12, the housing 112 can comprise another access panel 144 on a rear sidewall of the housing 112.

Figure 13:
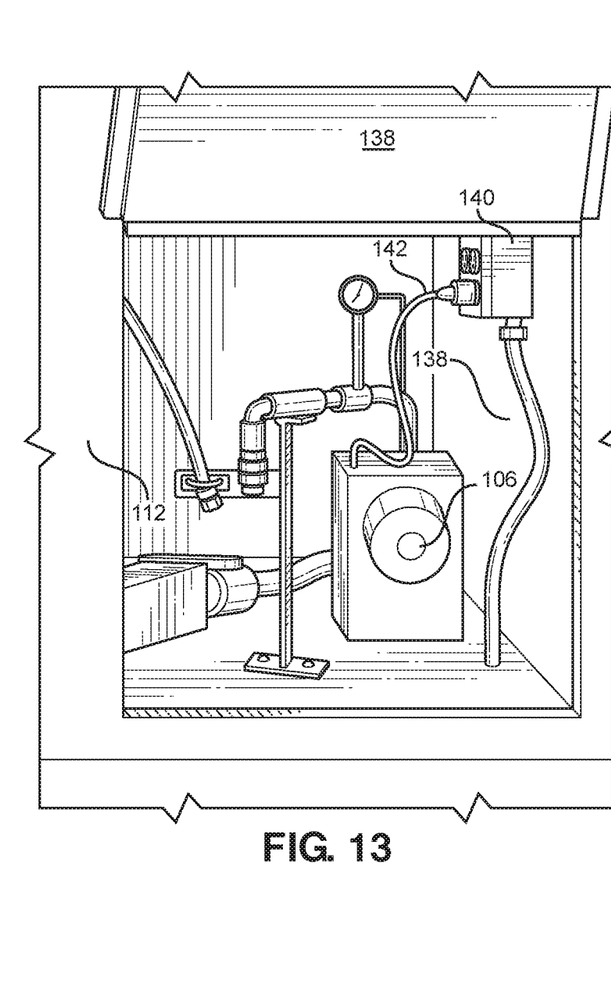
FIG. 13 illustrates example insulation of the within an enclosed version of an example portable water supply apparatus.

In some embodiments, as illustrated in FIG. 13, the housing 112 that covers the water tank and water pump 106 is filled with spray foam insulation 138, as well as under the trailer floor, upon which the water tank and components are mounted. The spray foam insulation prevents the water within the water tank from thermal effects of heat and/or cold ambient temperatures. The housing 112 and spray foam insulation 138 cooperate to effectively prevent sunlight from penetrating the water tank and causing the growth of algae, which is advantageous when the portable water supply apparatus is installed for long periods of time. The insulation also regulates the temperature of the water in the water tank to ensure that the water is at a relatively constant temperature.

Also illustrated in FIG. 13 is an outlet 140 that couples with the power supply 130. A power cable 142 of the pump 106 plugs into the outlet 140.

Figure 14:
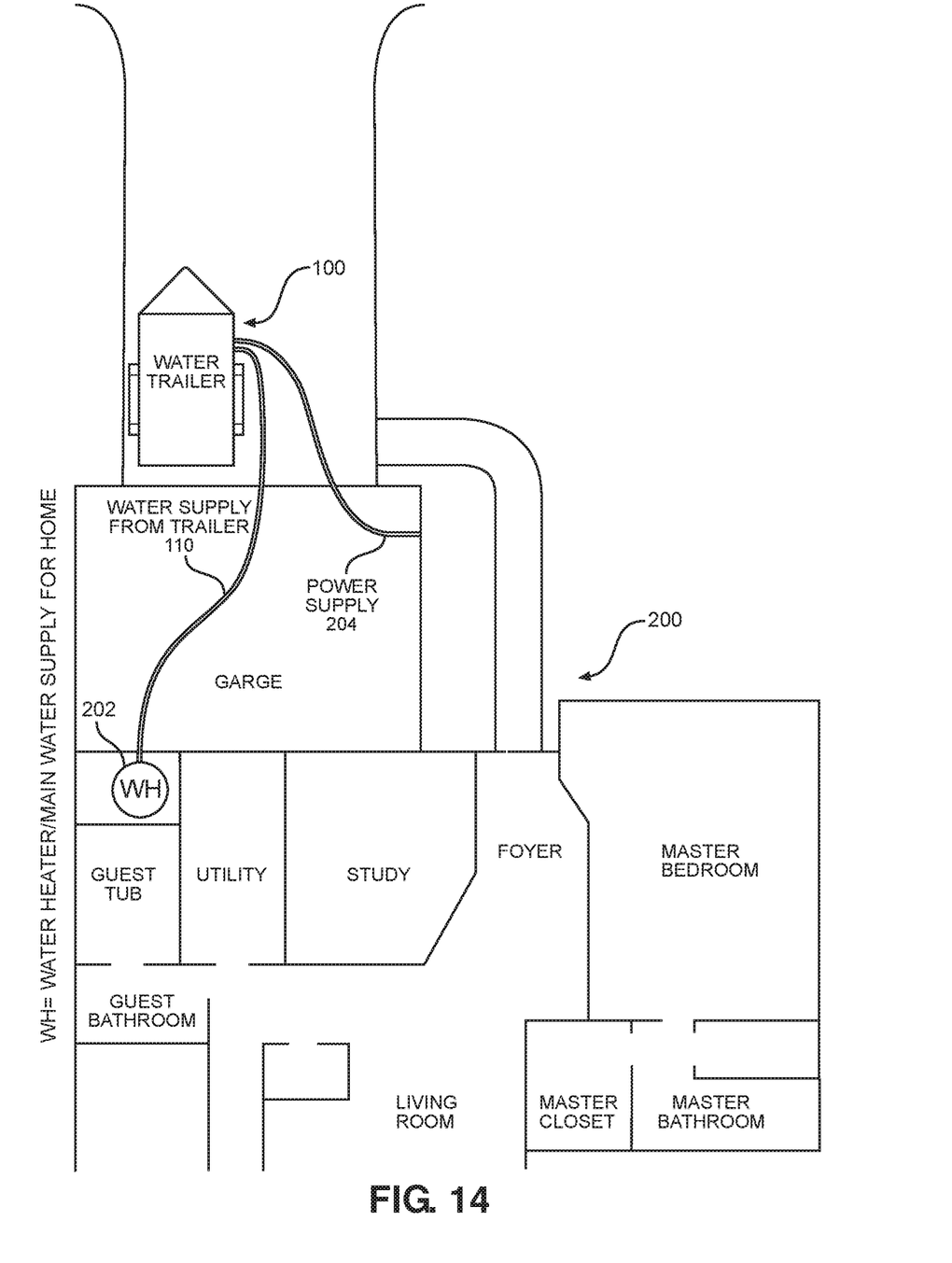
FIG. 14 is a schematic diagram illustrating an example use of an example portable water supply apparatus of the present disclosure.

FIG. 14 is a schematic diagram of the apparatus 100 in use. In one embodiment, the apparatus 100 is located proximate to a structure 200, such as a house. The water tank of the apparatus 100 is filled with water. In one embodiment, the water output line 110 is connected to a water heater 202 of the structure. The water pump and water metering system of the apparatus 100 are powered by connecting the pump to a power source, such as a power outlet 204 of the structure 200. In one embodiment, the apparatus 100 comprises a power source such as a generator that powers the water pump, rather than, or in addition to the use of the power from the structure 200.

When the metering system of the apparatus 100 senses a drop in water pressure such as from a tap opening within the structure, the water pump is activated to pump water from the water tank into the water heater 202 to maintain water pressure inside the structure.

Figure 15:
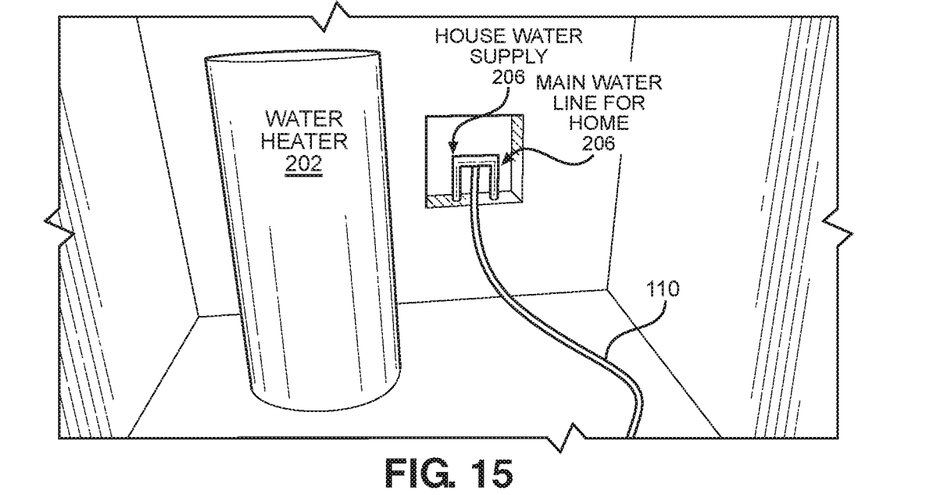
FIG. 15 is a schematic diagram illustrating an example use of an example portable water supply apparatus of the present disclosure.

FIG. 15 illustrates another view of a water supply input 206 of a structure. This water supply input 206 can comprise any water supply input interface for the structure, such as an interface that is associated with a main water line of the structure, although any water input can be utilized.

Figure 16:
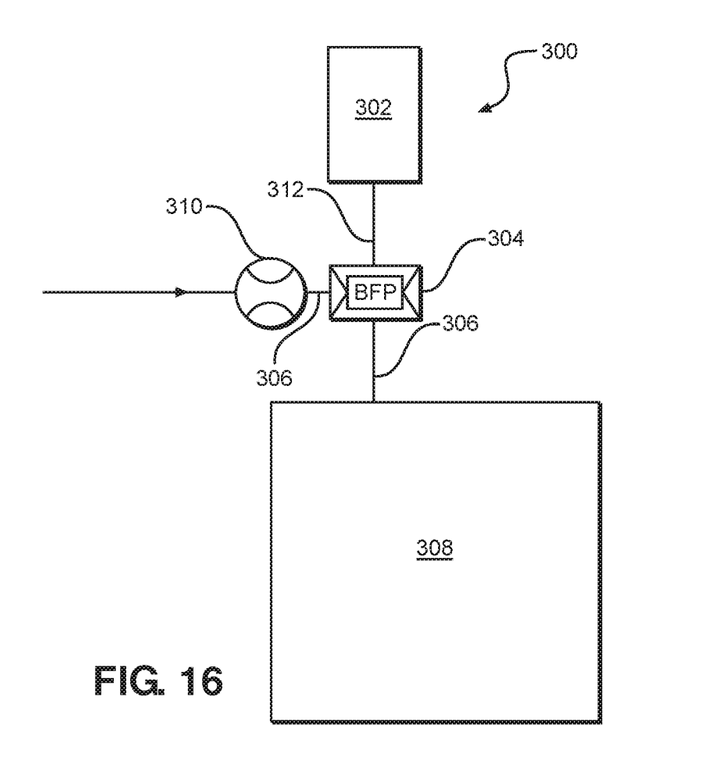
FIG. 16 diagrammatically illustrates coupling of a portable water supply apparatus of the present disclosure to a main water line of a structure proximate a municipal water meter.

FIG. 16 illustrates an example use of an apparatus of the present disclosure through use of a valve installed proximate a water meter of a home or structure. In some embodiments, a system 300 includes an example apparatus 302, such as any of the apparatuses disclosed in FIGS. 1-15. The system 300 also includes a valve 304 that is installed on a main water line 306 that delivers water to a home 308. Generally, when operational, a meter 310 supplies water to the home through the main water line 306.

In accordance with the present disclosure, the valve 304 is installed upstream of the meter 310 on the main water line 306. An installer can split the main water line 306 and install the valve 304 according to acceptable methods known to one in the art.

In one or more embodiments, the valve 304 can include a backflow prevention valve. The valve 304 interfaces with a hose or conduit 312 that couples with a pump of the example apparatus 302. The backflow prevention valve prevents water pumped by the pump from flowing across the meter 310. That is, the backflow prevention valve directs all water from the pump of the system 300 into the main water line 306.

In an example use case, a method for supplying water to a structure is provided. In some embodiments, the method includes a step of connecting a portable water delivery apparatus to a main water line of a structure. Again, this coupling could include coupling a water output line (e.g., conduit) from a pump of the water delivery apparatus to a water input in a home or structure. In some embodiments, this step includes coupling a hose connected to the pump with an external faucet of the home. In some embodiments, this step includes coupling a hose connected to the pump with a cold water line of a hot water heater in the home.

In some embodiments, the method includes sensing opening of a water tap within the structure. For example, a metering system senses when a water tap, such as a faucet, shower, tap, or appliance is open. This causes a pressure drop that can be sensed by the metering system that is in fluid communication with the main water line. Again, this could be a direct connection to a water tap or indirect through a valve installed at the meter of the home.

Nevertheless, once a pressure drop is sensed, the method includes activating the pump to deliver water into the main water line. The pressure of the water delivered by the pump should correspond approximately to the local water pressure. Again, this pressure can be varied by adjusting an output of the pump in some embodiments. To be sure, local water pressure can be determined through average use values or published (or otherwise obtained) water pressure values.

The method can also include sensing dosing of the water tap within the structure, such as when the water tap inside the home is closed. By way of example, when a water tap is closed, pressure will begin to build in the main water line. When the pressure, sensed by the metering system of the apparatus, in the main water line reaches a specified value or is within a threshold range, the metering system will cause the pump to turn off. Thus, the method includes a step of shutting off the pump when the water tap is closed.

In general, the pump can be controlled to deliver water to the structure at a rate that is substantially equal to a local water pressure. Also, a pressure of the water delivered by the pump can be selectively controlled.

In some embodiments, the metering system is configured to control the pump to compensate for water pressure dropping due to additional water taps opening within the structure. For example, if two faucets are opened, additional water pressure is required.

Figure 17:
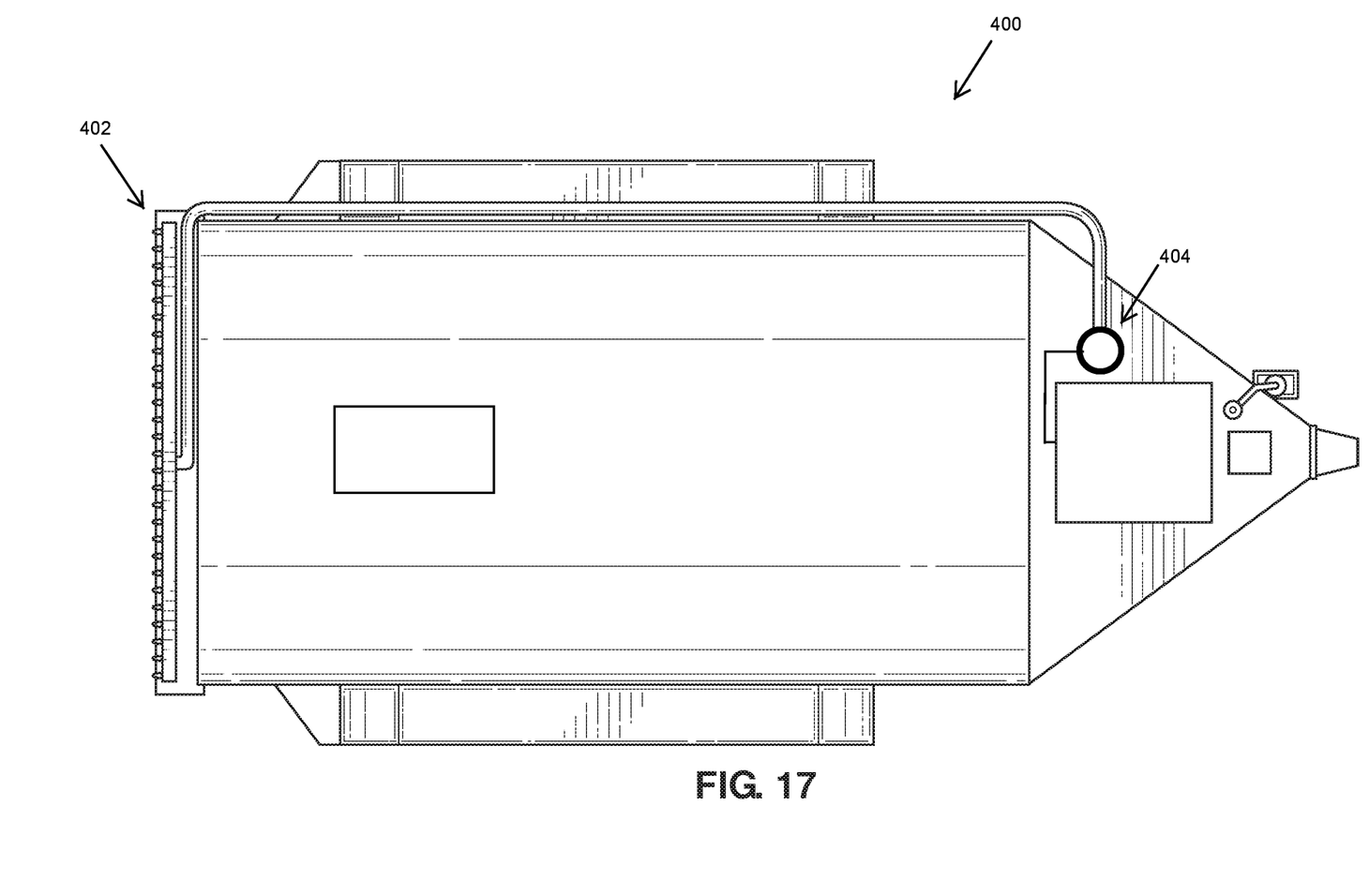
FIG. 17 is a top down view of another example portable water supply apparatus that comprises a spray attachment.

FIG. 17 illustrates one of a plurality of possible accessories associated with a portable water supply apparatus 400. The apparatus 400 is identical in construction to the apparatus 100 above, with the exception that the apparatus 400 comprises an accessory 402. In some embodiments the accessory 402 comprises a spray bar that is mounted rearwardly of the water tank. The accessory 402 is coupled to a water pump 404. The spray bar can be used for any purpose that would be known to one of skill in the art such as dust control, irrigation, and so forth.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A portable water delivery apparatus, comprising:
   a portable frame trailer comprising:
     a base; and
     at least two wheels;
   a tank configured to be transported on the portable frame trailer;

arcuate tie down rails that interface with the base of the portable frame trailer and overlap the tank to secure the tank to the base;

a pump for delivering water in the tank to an interface;

a one way valve that is installed on a main water line of a structure at a water meter for the structure, the one way valve is installed upstream of the water meter to prevent water pumped by the pump from flowing through the water meter; and a portable power supply delivering power to the pump.

2. The portable water delivery apparatus according to claim 1, further comprising a metering system coupled with the pump, the metering configured to sense a drop in water pressure, wherein upon sensing a drop in water pressure, the pump delivers the water to the water input.

3. The portable water delivery apparatus according to claim 1, further comprising a housing that covers the portable power supply.

4. The portable water delivery apparatus according to claim 3, wherein the housing is hingedly coupled to the base of the portable frame trailer.

5. The portable water delivery apparatus according to claim 4, wherein the housing comprises a hinged access panel that allows for access to the portable power supply when the housing is in a closed position.

6. The portable water delivery apparatus according to claim 1, further comprising a base enclosure that encloses at least the tank and the pump.

7. The portable water delivery apparatus according to claim 6, wherein the base enclosure further comprises access bilateral access doors disposed forwardly of the at least two wheels.

8. The portable water delivery apparatus according to claim 6, wherein the base enclosure is lined with an insulating spray foam material.

9. The portable water delivery apparatus according to claim 6, further comprising a hitch for coupling with a vehicle.

10. A portable water delivery apparatus, comprising:
a portable frame trailer comprising:
a base; and
at least two wheels;

a tank configured to be transported on the portable frame trailer;

arcuate tie down rails that interface with the base of the portable frame trailer and overlap the tank to secure the tank to the base;

a pump for delivering water in the tank to an interface;

a backflow prevention valve that is installed on a main water line of a structure at a water meter for the structure, wherein the backflow prevention valve is coupled to the water meter and the interface, the backflow prevention valve preventing water pumped by the pump from flowing through the water meter;

a metering system controlling the pump, wherein the metering system is configured to:
sense variations in water pressure in the structure; and
control operations of the pump to compensate for the variations in water pressure; and a portable power supply delivering power to the pump.

11. The portable water delivery apparatus according to claim 10, further comprising a spray bar located on a rear of the portable frame trailer.

* * * * *